US011021168B2

(12) United States Patent
Adams et al.

(10) Patent No.: US 11,021,168 B2
(45) Date of Patent: Jun. 1, 2021

(54) VEHICULAR IRRITANT DETECTION AND MITIGATION SYSTEM

(71) Applicant: BlackBerry Limited, Waterloo (CA)

(72) Inventors: Neil Patrick Adams, Waterloo (CA); Jeremy Lawson Kominar, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/149,250

(22) Filed: Oct. 2, 2018

(65) Prior Publication Data

US 2020/0101980 A1  Apr. 2, 2020

(51) Int. Cl.
*B60W 50/00* (2006.01)
*E05F 15/70* (2015.01)
*B60Q 9/00* (2006.01)

(52) U.S. Cl.
CPC .......... *B60W 50/0098* (2013.01); *B60Q 9/00* (2013.01); *E05F 15/70* (2015.01); *B60W 2556/45* (2020.02); *B60W 2710/30* (2013.01); *E05Y 2900/55* (2013.01)

(58) Field of Classification Search
CPC ............................................... B60W 50/0098
USPC ......................................................... 701/49
See application file for complete search history.

(56) References Cited

U.S. PATENT DOCUMENTS

| 6,926,601 B2 * | 8/2005 | Aoki ........................ A61L 9/16 454/121 |
| 10,282,625 B1 * | 5/2019 | Wengreen .......... G01C 21/3415 |
| 2015/0032266 A1 * | 1/2015 | Weast .................... B60H 1/008 700/276 |
| 2016/0318368 A1 | 11/2016 | Alger et al. |
| 2017/0278408 A1 * | 9/2017 | Gordon ................ G08G 5/0034 |
| 2017/0313322 A1 * | 11/2017 | Onorato ................ G07C 5/008 |

(Continued)

FOREIGN PATENT DOCUMENTS

| CN | 205168902 U * | 4/2016 | ............ B64C 39/02 |
| DE | 102016105135 A1 | 9/2016 | |
| DE | 102016014223 A1 | 5/2017 | |

(Continued)

OTHER PUBLICATIONS

Google Machine Translation of Japanese Patent Pub. No. JP2016113088A that was published in 2016 (downloaded Sep. 11, 2019).*

(Continued)

*Primary Examiner* — Jean Paul Cass
(74) *Attorney, Agent, or Firm* — Rowand LLP

(57) ABSTRACT

Methods and systems for mitigating irritants during travel in a vehicle. The method includes determining, at a remote server, an airborne irritant is present external to the vehicle, which may involve data from the vehicle or from other nearby vehicles. The data may be direct irritant measurements by sensors or may be indirect data indicative of possible irritants. Based on the determination that the airborne irritant is likely present external to the vehicle, an irritant mitigation action is caused within the vehicle. The irritant mitigation action may include displaying a notification signaling presence of the airborne irritant, outputting an audio notification signaling presence of the airborne irritant, closing a window of the vehicle, or closing an air vent of the vehicle.

20 Claims, 3 Drawing Sheets

(56) References Cited

U.S. PATENT DOCUMENTS

2018/0057013 A1    3/2018  Mullett

FOREIGN PATENT DOCUMENTS

| DE | 102017220350 A1 | | 6/2018 |
|---|---|---|---|
| JP | H04173424 | | 6/1992 |
| JP | 5626000 B2 | * | 11/2014 |
| JP | 2016113088 A | * | 6/2016 |
| KR | 100482508 B1 | | 4/2005 |
| WO | 2007064269 | | 6/2007 |

OTHER PUBLICATIONS

Google Machine Translation of Chinese Patent Pub. No. CN205168902U that published in Apr. 20, 2016.*
Google Machine Translation of Japanese Patent Pub. No. JP5626000B2 that was published in 2012.*
EPO: European Extended Search Report relating to EP application No. 19200254.1, dated Feb. 24, 2020.
European Office Action, EP Application No. 19200254.1 dated Feb. 1, 2021.

* cited by examiner

VEHICULAR IRRITANT DETECTION AND MITIGATION SYSTEM

FIELD

The present application generally relates to irritant detection and reaction systems and, in particular, vehicular systems and methods for detecting or anticipating odors or other irritants and pre-emptively reacting to expected irritant events.

BACKGROUND

Airborne irritants, like dust, pollen, odors, and the like, can sometimes enter the cabin on a vehicle through open windows or through the air vents. Once in the cabin, the vehicle occupants must wait until the air outside the vehicle no longer contains the irritant and the replace the cabin air with fresh air from outside. This is typically done by opening the air vents to the external air and running the fan, or by opening windows.

It has been proposed to put an odor sensor in a vehicle to detect offensive odors, such as smoke, within the vehicle so as to then purge the cabin air. This type of system is aimed at automated taxi or rental vehicles where one passenger may cause an odor in the vehicle that should be purged from the cabin air before the next passenger uses the vehicle. However, such systems do not address the problem of external smells entering the cabin and polluting the air in the vehicle, at which point the vehicle occupants are exposed to the odor or other irritants and it is too late to prevent exposure. Purging the interior air once a smell or other irritant is detected in the cabin only introduces further smelly air into the cabin.

It would be advantageous to provide for systems and methods of detecting and reacting to airborne irritants.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
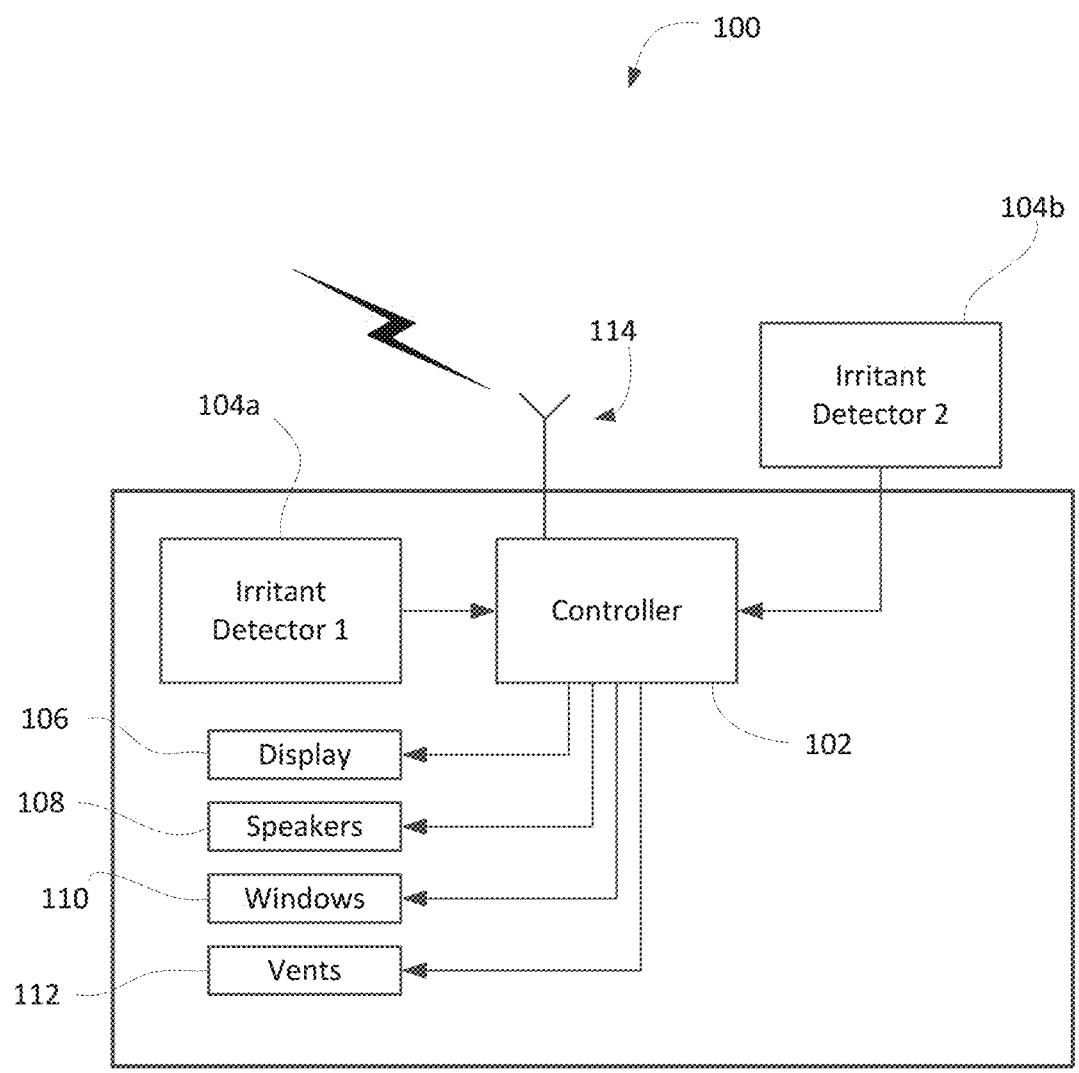
FIG. 1 shows a block diagram of an example vehicle having a system to mitigate against airborne irritants.

In a first aspect, the present application describes a method of mitigating irritants during travel in a vehicle. The method may include determining an airborne irritant is present external to the vehicle; and based on the determination that the airborne irritant is present external to the vehicle, automatically causing an irritant mitigation action within the vehicle.

In another aspect, the present application describes an irritant mitigation system for a vehicle. The system may include a processor; and memory storing program executable instructions that, when executed by the processor, cause the processor to determine that an airborne irritant is present external to the vehicle, and based on the determination that the airborne irritant is present external to the vehicle, automatically cause an irritant mitigation action within the vehicle.

In yet a further aspect, the present application describes an irritant mitigation system for a vehicle. The system may include a server in data communication with the vehicle and a plurality of other vehicles, the server having a processor and memory storing program executable instructions that, when executed by the processor, cause the processor to receive vehicle data from a plurality of other vehicles; determine, from the vehicle data, that the airborne irritant is likely to be present external to the vehicle; and send a notification to the vehicle advising of the airborne irritant likely to be present external to the vehicle.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Automobiles of various types typically include air circulation system that bring external air into the cabin. The air circulation system often includes air filters to remove particulate matter. Vents on the air circulation system may be manipulated between open and closed settings. In a closed setting, external air may be blocked from entering the vehicle and air within the cabin may be recirculated if the air system fan is operating. In an open setting, air external to the vehicle may enter the air circulation system to be added to and mixed with the cabin air.

In addition, vehicle occupants may choose to travel with one or more windows partially or fully open, which allows large quantities of external air to enter the cabin without filtering. The term "window" is used in its broadest sense to include any portion of the vehicle cabin that may be opened or closed while travelling and that, when open exposes the cabin to the external environment. This may include a "moonroof" or "sunroof", whether opaque or transparent. It may further include a roof of a convertible automobile.

Vehicles travelling on the roadway may occasionally encounter airborne irritants from the environment external to the vehicle. There are many types of airborne irritants. For example, an odor may be present external to the vehicle. Examples of unpleasant odors that may be commonly encountered include skunks, smoke, sulfur, manure, organic garbage, and the like. Other irritants may include airborne particles, like dust or chemicals or pollen. Another example of an airborne irritant is excessive noise, such as from construction or the like.

When an airborne irritant is encountered during travel, the vehicle occupants typically close any open windows and/or close any open air vents to prevent further ingress of the irritant to the cabin of the vehicle. However, before the vehicle occupants take such action manually, the irritant has typically entered the cabin in sufficient quantity to irritate the occupants. In the case of an odor, for example, once the odor has entered the cabin closing the vents and windows may have the unpleasant effect of trapping the odor in the confined air of the cabin until the vehicle has passed through the area of the smell such that the cabin air can be purged by opening the vents and/or windows to replace the cabin air with external air.

The present application describes systems and method to detect or anticipate occurrence of an airborne irritant external to the vehicle and to take reactive action. The reactive action may include notifying the vehicle occupants and/or taking an automated irritant mitigation action, such as closing vents and/or windows that are open.

In some implementations, occurrence of an irritant is determined using one or more irritant detectors. The irritant may be detected in or outside the vehicle using the one or more irritant detectors. For example, the irritant may be detected by an odor detector in the case of smells. The odor detector may include chemosensors and/or gas chromatography, in some cases.

In some implementations, the occurrence of an irritant is detected or inferred based on data from other vehicles in the vicinity of a first vehicle, and an irritant message is sent to the first vehicle to cause it to take reactive action. In some cases, the data from the other vehicles may include actual irritant measurements using irritant detector(s) associated with those vehicles. In some cases, the data from the other vehicles may include data correlated with occurrence of an irritant, such as closing of windows and/or vents. Using this crowd-sourced data from nearby vehicles, the location of a likely irritant may be identified. Mapping functions may be used to determine that the first vehicle is likely to pass through the location of the likely irritant. By sending a message to the first vehicle regarding the likely irritant, reactive measures may be taken in advance of arrival at the location of the irritant.

Reference is now made to FIG. 1, which shows, in block diagram form, a simplified vehicle 100. The vehicle 100 includes a controller 102. The controller 102 may include one or more processors, memory, executable program instructions, and various input, output, and communications subsystems. The vehicle 100 may include one or more wireless antennas 114 to enable wireless communication with remote devices, including through cellular data communications, wireless local area networks, dedicated short-range communications (DSRC), or any other wireless communications protocol. The controller 102 may be implemented by, or a part of, the vehicle electronic computer system that controls various aspects of the vehicle operation and a plurality of sensors that gather vehicle data.

The vehicle 100 includes one or more irritant detectors 104. In this example, the vehicle 100 shows an internal irritant detector 104*a* and an external irritant detector 104*b*. In various implementations, the irritant detectors 104 may be odor detectors, air quality sensors, particular sensors, noise (e.g. decibel meter) sensors, pollen sensors, or any other irritant sensor.

The vehicle may include a display 106, such as a dashboard LCD or LED screen and/or icons that may be selectively illuminated in the dashboard, and one or more speakers 108 through which alerts and other sounds can be played. The vehicle 100 further includes operable windows 110, such as the side windows and/or any sunroof or moonroof, for examples, and air vents 112 for controlling whether cabin air circulation system is closed to external air or open to external air. The controller 102 is electrically coupled to the display 106, the speakers 108, the windows 110 and the air vents 112 and is capable of causing output through the display 106 and or speakers 108, and is capable of causing changes in the state of the windows 110 and/or the air vents 112. It will be appreciated that there may be various electronic or electro-mechanical systems that directly control elements of the vehicle 100 but which may operate in response to commands or messages from the controller 102.

The irritant detectors 104 may provide irritant sensor data to the controller 102, which may determine whether an irritant is present and detected at more than a threshold level. If so, its detection may trigger reactive operations. More than one threshold may be set to trigger different operations, i.e. irritant mitigation actions. For example at a first threshold, a warning message may be output to alert the vehicle occupants. At a higher second threshold, an operation such as closing open windows or closing open vents may be triggered. In some cases, the measurement-to-threshold comparison may occur within the irritant detector 104 itself, which may then output a signal to the controller 102 indicating whether the threshold has been exceeded.

In an embodiment in which there is the internal irritant detector 104*a* and the external irritant detector 104*b*, the controller may determine whether there is a differential between the measured irritant levels at the two detectors that indicates presence of an external irritant that has not yet resulted in presence of an internal irritant. This situation may result in reactive operations such as closing of vents or closing of windows to prevent the external irritant from entering the cabin. Conversely, if an internal irritant is detected and the external irritant detector does not show the presence of the irritant, then the vents and/or windows may be opened to flush the cabin air. Opening of windows may be subject to a determination that the external temperature or humidity is no higher or lower than preset levels to prevent extreme temperature changes, and may be subject to a determination that no precipitation event (e.g. rain or snow) is currently occurring. In some examples, if an irritant is detected by the external irritant detector and the same or similar levels of irritant are detected by the internal irritant detector, then it may be too late to take any reactive measures and the controller 102 may determine not to output any warnings or change the state of any windows or vents.

It will be appreciated that the direct measurement of irritants is a reliable mechanism for determining that an irritant is present and taking reactive action. However, it will also be appreciated that it may be advantageous to provide for anticipatory reaction based on determination that the vehicle will encounter an irritant before it actual encounters the airborne irritant. Such an anticipatory irritant detection system and method may be used in place of direct irritant measurement or may be used in addition to direct irritant measurement.

Figure 2:
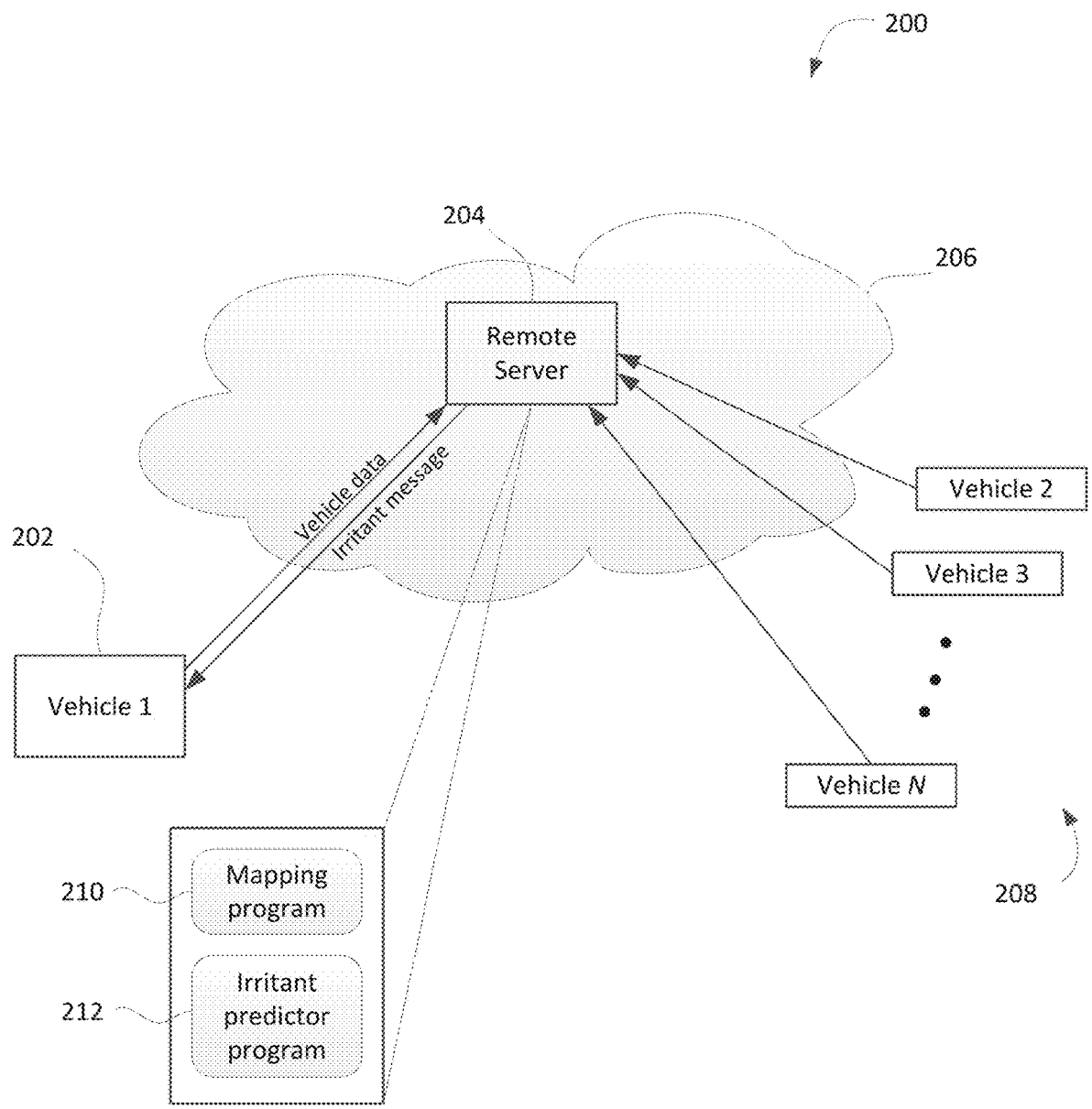
FIG. 2 diagrammatically shows an example of a system for anticipatory identification of likely airborne irritants.

Reference is now made to FIG. 2, which diagrammatically illustrates an example system 200 for irritant detection and reaction. The system includes a first vehicle 202 in wireless communication with a remote server 204. The system further includes a plurality of vehicles 208 that are also in wireless communication with the remote server 204. The remote server 204 may include one or more computing devices connected to one or more wired and/or wireless networks 206, such as the Internet and one or more public land mobile networks (e.g. cellular data networks), and configured for data communication with the first vehicle 202 and the plurality of vehicles 208.

The remote server 204 may include one or more processors, memory, and processor-executable instructions that, when executed, cause the processors to carry out one or more of the operations described herein. The processor-executable instructions may be in the form of modules, applications, or other computer programs, and may be standalone programs or incorporated into larger programs relating to vehicles.

As an example, the remote server 204 may include a mapping program 210 and an irritant predictor program 212. The mapping program 210 may, when executed, receive GPS or other location data from the vehicles 202, 208, and/or trajectory data, and may determine one or more vehicle paths in a mapped environment. The mapping program 210 may include storage of, or access to, a geographic information system (GIS) for terrestrial roadway geography information. In some cases, the mapping program 210 may interface with one or more third party GIS system, such as Google Maps™, or with governmental mapping or traffic data systems.

The irritant predictor program 212 may, when executed, receive vehicle data from the plurality of vehicles 208 and, based on that data, may determine whether an irritant is likely present. In concert with the mapping program 210, the irritant predictor program 212 may determine the location of the likely irritant.

In a first example, the remote server 204 may base the determination of whether an irritant is present in a location on irritant detection by the plurality of vehicles 208. The plurality of vehicles 208 may periodically or opportunistically report vehicle data to the remote server 204. The vehicle data from one of the vehicles may include GPS coordinates for the vehicle. It may further include orientation and/or trajectory data. The vehicle data may further include one or more irritant measurements. The irritant measurements may include direct measurement data from one or more irritant detectors in the vehicle, or may include a higher-level abstraction of the irritant level in the vicinity of the vehicle (e.g. none, very low, low, moderate, high, very high). Additional data may be provided regarding the vehicle, such as the location of the detector (internal or external or both), and status information regarding the states of windows and vents on the vehicle.

The remote server 204 may determine, from the vehicle data reported by the plurality vehicles, that an irritant is likely present in a particular location. The threshold for such a determination may be tuned based on the sensitivity and accuracy desired for a particular application. For example, the remote server 204 may based the determination on at least a minimum number of vehicles (e.g. 4 or more) within a threshold distance of each other (e.g. 500$m$) and within a time window (e.g. 1 minute), each reporting a high or very high level of airborne irritant. It will be understood that the foregoing parameters are merely examples.

If the remote server 204 identifies a likely irritant, then it may determine whether there are other vehicles with which it can communicate that are in the same area or are on a trajectory towards the same area. The range of the search may be tuned to be appropriate for a particular application. In some examples, the range may be based on the time within which vehicles may be expected to reach the area given the current speed of traffic in an associated roadway.

Having identified vehicles that may be expected to enter the area in a specific time range (e.g. in the next two minutes), the remote server 204 may send those vehicles, such as the first vehicle 202, an irritant message. The irritant message may simply include a signal indicating a likely irritant event. In some implementations, additional information may be provided, such as the nature of the irritant, the level of any irritant measurements or an average thereof, the location of the expected irritant, the time of determination of the likely irritant by the remote server, or other such data.

The first vehicle 202 receives the irritant message and may then determine whether to take reactive measures to mitigate exposure to the irritant. As noted above, the reactive measures may include notifying the vehicle occupants and/or automatically closing windows or vents, for example. The measures may be staged based on the level of expected irritant reported by the remote server 204. The measures may further be conditional on the current state of the vehicle systems. For example, if the windows and vents are closed, then no mitigation measures may be required. In one example, the measures may include altering a route in a navigation function, so as to avoid the location of the upcoming irritant, if possible. The remote server 204 may send a proposed altered route, or the reactive measures may include signaling a navigation module in the vehicle of the location of the upcoming irritant to enable the navigation module to plan around the expected irritant.

In a second example, the remote server 204 may base the determination of whether an irritant is present in a location on vehicle data other than direct irritant measurements. In a particular example, the vehicle data from the plurality of vehicles 208 includes information regarding the status of the vents and/or windows in those vehicles. For instance, vehicle data may include location and data indicating a change in open/closed status of a window or a vent. At the remote server 204, the vehicle data from the plurality of vehicle 208 may be analyzed and a determination may be made that a significant percentage of vehicles all present in or proximate to a location have acted to close windows and/or vents to prevent external air from entering the respective cabins. This may be indicative of an irritant present in the location that prompted the occupants of the significant percentage of vehicles to cause that state change. Accordingly, the remote server 204 may determine that a likely irritant is present in that area and may send irritant messages to vehicles approaching the area.

The determination of whether vehicle data is correlated to, or indicative of, the presence of an irritant may be carried out using pre-design logic rules. In some instances, a machine learning algorithm may be used, and may be initialized using a set of training data. In some cases, artificial intelligence may be used to implement the irritant predictor program 212. For example, a feedback mechanism and Bayesian inference or other machine learning techniques may be used to improve the performance of the irritant predictor program 212.

The determination may combine more than one type of vehicle data in determining that there is a likely irritant at the location. For example, the vehicle data may include state changes in windows and state changes in vents. In another example the vehicle data may further include irritant measurements from one or more irritant detectors. In yet another example, the vehicle data may be combined with data regarding the location obtained from a third party or government source. Such third party data may indicate the presence of an event or industry that may correlate to the irritant. For example, the location may be one for which there is active road construction, which could be a source of dust, noise, or odor. As another example, the location may be proximate a pulp-and-paper mill or a garbage dump, either of which may be a source of strong odors. Types of other non-vehicle data will be appreciated by those ordinarily skilled in the art.

Figure 3:
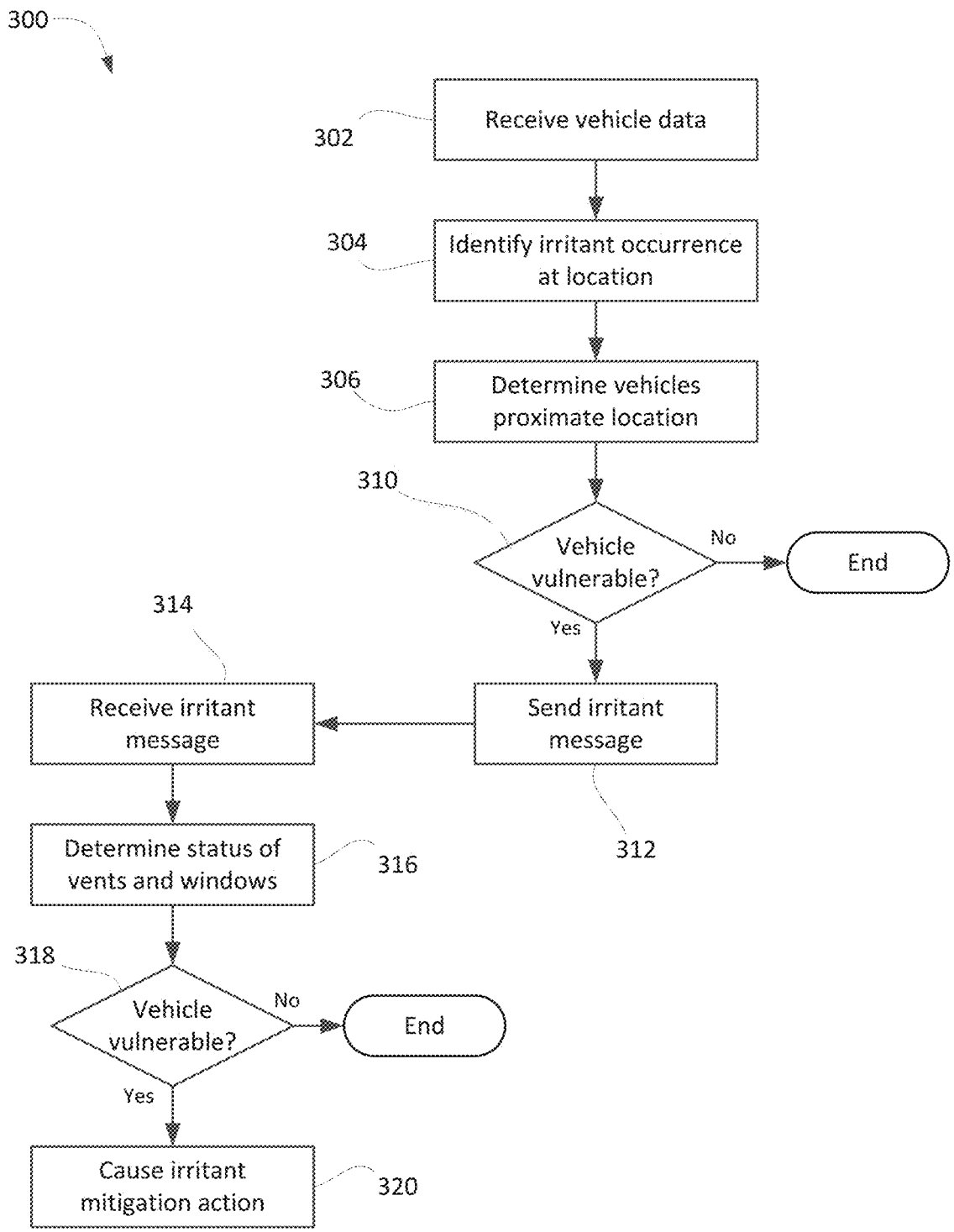
FIG. 3 shows, in flowchart form, one example method for advance action against expected airborne irritants in a vehicle.

Reference is now made to FIG. 3, which shows an example method 300 for mitigating airborne irritants in a vehicular context. Parts of the method 300 may be implemented by a remote server in communication with a plurality of vehicles. Parts of the method 300 may be implemented by a vehicle approaching a location determines to have a likely airborne irritant.

The method 300 may include receiving vehicle data from a plurality of vehicles in operation 302. The vehicle data may include location data and/or trajectory information for a particular vehicle. It may further include vehicle status or status change information relating to the cabin air environment. That may include irritant measurements, external or internal. It may include information about changes in whether windows or vents are open or closed.

In operation 304, a likely irritant is determined to be present at a particular location. The determination is based on the vehicle data received from the plurality of vehicles. The determination may include a likely intensity determination that indicates the level of irritation likely to be caused by the irritant, which may be determined based on actual measurements in the vehicle data or the strength of the correlation discernable in the vehicle data for the plurality of vehicles.

Once a likely irritant is identified as being present in a location, vehicles approaching the location are identified in operation 306. A vehicle may be identified based on a determination that the vehicle is on a path to intersect the location. That determination may be based on data received regarding the current vehicle location, trajectory and/or geographic roadway information. A time or distance window may be applied in searching for nearby vehicles. For instance, the search to identify nearby vehicles may first be confined to a distance metric, such as vehicles within 1 km, as an example. The search may then further be restricted based on trajectory and/or roadway information to those vehicles moving in a direction at least generally towards the location or that are projected to pass within a particular distance of the location, such as 50 or 100 meters. In some cases, a time metric may be used, such as confining the search to vehicles that are projected to pass within a particular distance of the location in the next 5 minutes, for example. Other constraints and parameters may be used. The general principle is to identify, from vehicle position, trajectory and roadway information, those vehicles that appear likely to pass near the location of the irritant in the relatively near future.

Once the vehicles are identified in operation 306, in operation 310 an assessment may optionally be made as to whether those vehicles are already protected from the irritant. For example, vehicle data may be available that indicates that one of the vehicles has its windows closed and its vents closed to external air. In some cases, it may be determined that no irritant message, i.e. notification or warning, need be sent to that vehicle. However, in other cases, the notification may still be sent for the purpose of warning vehicle occupants not to open windows or vents.

In operation 312, the irritant message is sent to the vehicles identified in operation 306, subject to any excluded by operation 308.

At operation 314, one of the identified vehicles receives the irritant message and, in operation 316 in this example, that vehicle determines the status of its windows and vents. The vehicle may evaluate whether it is vulnerable to the potential irritant based on the status of its windows and vents in operation 318. If not vulnerable, e.g. windows and vents are closed, then the vehicle may take no action or may take only a lower level mitigation action such as outputting a visual or auditory notification regarding the likely airborne irritant. If vulnerable, then in operation 320 the vehicle causes a mitigation action. In some implementations, this includes outputting a visual and/or auditory warning notification to alert the vehicle occupants to the possible irritant. In some cases, it may alternatively or additionally include causing the closing of a vent or at least one of the windows.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of mitigating irritants during travel in a vehicle, the method comprising:
communicating vehicle data to a remote server, the vehicle data including at least location data of the vehicle and data regarding window and vent status within the vehicle;
when it is determined, by the remote server and based at least on the location data of the vehicle and the data regarding window and vent status within the vehicle, that the vehicle is approaching a location where an airborne irritant is likely to be present and that at least one of the windows or vents within the vehicle is open:
receiving, from the remote server, a notification advising that the vehicle is approaching the location where the airborne irritant is likely to be present external to the vehicle;
in response to receiving the notification, determining an updated window and vent status within the vehicle;
when it is determined, based at least on the updated window and vent status within the vehicle, that at least one of the windows or vents within the vehicle is open, automatically causing an irritant mitigation action within the vehicle; and
when it is determined, based at least on the updated window and vent status within the vehicle, that all windows and vents in the vehicle are closed, outputting a notification signaling presence of the airborne irritant; and
when it is determined, by the remote server and based at least on the location data of the vehicle and the data regarding window and vent status within the vehicle, that the vehicle is approaching a location wherein an airborne irritant is likely to be present and that all windows and vents within the vehicle are closed, sending a notification to the vehicle causing the vehicle to take a lower level mitigation action.

2. The method of claim 1, wherein the irritant mitigation action includes one or more of:
displaying a notification signaling presence of the airborne irritant;
outputting an audio notification signaling presence of the airborne irritant;
closing a window of the vehicle; or
closing an air vent of the vehicle.

3. The method of claim 1, wherein the vehicle includes an irritant detector to sense irritants external to the vehicle, and the method further comprises receiving a signal from the irritant detector indicating presence of the airborne irritant.

4. The method of claim 3, wherein the vehicle further includes an internal irritant detector to sense irritants inside the vehicle, and the method further comprises determining a differential between irritant levels measured inside the vehicle and outside the vehicle.

5. The method of claim 1, further comprising the remote server receiving vehicle data from a plurality of other vehicles and determining, from the vehicle data, that the airborne irritant is likely to be present external to the vehicle.

6. The method of claim 5, wherein the vehicle data received from the plurality of other vehicles includes irritant detector measurements from the plurality of other vehicles.

7. The method of claim 5, wherein the vehicle data received from the plurality of other vehicles includes data regarding changes in window or vent status within the plurality of other vehicles, and wherein determining, from the vehicle data, that the airborne irritant is present external to the vehicle includes determining that the changes in window or vent status within the plurality of other vehicles is indicative of the likely presence of the airborne irritant.

8. The method of claim 5, further comprising determining, from the vehicle data received from the plurality of other vehicles, a location associated with the other vehicles, identifying one or more vehicles within a threshold range of the location, and sending the notification to said one or more vehicles.

9. The method of claim 8, wherein identifying includes determining a set of vehicles within a distance of the location, selecting a subset of the set of vehicles based on a trajectory determined for each of the vehicles in the set, wherein the subset includes said one or more vehicles.

10. An irritant mitigation system for a vehicle, the system comprising:
a processor; and
memory storing program executable instructions that, when executed by the processor, cause the processor to:
communicate vehicle data to a remote server, the vehicle data including at least location data of the vehicle and data regarding window and vent status within the vehicle;
when it is determined, by the remote server and based at least on the location data of the vehicle and the data regarding window and vent status within the vehicle, that the vehicle is approaching a location where an airborne irritant is likely to be present and that at least one of the windows or vents within the vehicle is open:
receive, from the remote server, a notification advising that the vehicle is approaching the location where the airborne irritant is likely to be present external to the vehicle; and
in response to receiving the notification, determine an updated window and vent status within the vehicle;
when it is determined, based at least on the updated window and vent status within the vehicle, that at least one of the windows or vents within the vehicle is open, automatically cause an irritant mitigation action within the vehicle; and
when it is determined, based at least on the updated window and vent status within the vehicle, that all windows and vents in the vehicle are closed, outputting a notification signaling presence of the airborne irritant; and
when it is determined, by the remote server and based at least on the location data of the vehicle and the data regarding window and vent status within the vehicle, that the vehicle is approaching a location wherein an airborne irritant is likely to be present and that all windows and vents within the vehicle are closed, sending a notification to the vehicle causing the vehicle to take a lower level mitigation action.

11. The irritant mitigation system of claim 10, wherein the irritant mitigation action includes one or more of:
displaying a notification signaling presence of the airborne irritant;
outputting an audio notification signaling presence of the airborne irritant;
closing a window of the vehicle; or
closing an air vent of the vehicle.

12. The irritant mitigation system of claim 10, further comprising an irritant detector to sense airborne irritants external to the vehicle, and wherein the processor is to determine that an airborne irritant is present by receiving a signal from the irritant detector indicating presence of the airborne irritant.

13. The irritant mitigation system of claim 12, further comprising an internal irritant detector to sense airborne irritants inside the vehicle, and wherein the processor is to determine that an airborne irritant is present by determining the differential between irritant levels measured inside the vehicle and outside the vehicle.

14. The irritant mitigation system of claim 10, further comprising the remote server to receive vehicle data from a plurality of other vehicles and determine, from the vehicle data received from the plurality of other vehicles, that the airborne irritant is likely to be present external to the vehicle.

15. An irritant mitigation system, the system comprising:
a server in data communication with a plurality of vehicles, the server having a processor and memory storing program executable instructions that, when executed by the processor, cause the processor to:
receive vehicle data from the plurality of vehicles, the vehicle data including irritant detector measurements, location data and data regarding window and vent status within each vehicle;
determine, from the vehicle data, a particular location where an airborne irritant is likely to be present;
identify, from the vehicle data, at least one vehicle of the plurality of vehicles approaching the particular location where the airborne irritant is likely to be present and where at least one of the windows or vents within the vehicle is open;
send a notification to the at least one vehicle advising of the airborne irritant likely to be present external to the vehicle to cause the vehicle to determine an updated window and vent status and when the vehicle determines, based on the updated window and vent status, that at least one of the windows or vents within the vehicle is open, automatically cause an irritant mitigation action within the vehicle;

identify, from the vehicle data, at least one vehicle of the plurality of vehicles approaching the particular location and having all windows and vents closed; and sending a notification to the at least one vehicle having all windows and vents closed to automatically take a lower level mitigation action.

16. The irritant mitigation system of claim 15, wherein the vehicle data includes data regarding changes in window or vent status within at least some of the vehicles, and wherein the instructions, when executed by the processor, further cause the processor to determine that an airborne irritant is likely present by determining changes in window or vent status of the at least some of the vehicles.

17. The irritant mitigation system of claim 15, wherein the processor identifies the at least one vehicle by determining a set of vehicles within a distance of the location, and selecting a subset of the set of vehicles based on a trajectory determined for each of the vehicles in the set.

18. The method of claim 1, wherein the lower level mitigation action includes one or more of:
    displaying a notification signaling presence of the airborne irritant; or
    outputting an audio notification signaling presence of the airborne irritant.

19. The irritant mitigation system of claim 10, wherein the lower level mitigation action includes one or more of:
    displaying a notification signaling presence of the airborne irritant; or
    outputting an audio notification signaling presence of the airborne irritant.

20. The irritant mitigation system of claim 15, wherein the lower level mitigation action includes one or more of:
    displaying a notification signaling presence of the airborne irritant; or
    outputting an audio notification signaling presence of the airborne irritant.

* * * * *